United States Patent Office 3,424,790
Patented Jan. 28, 1969

3,424,790
PROCESS FOR PREPARING CARBOXYMETH-YLATED POLYETHYLENIMINE AND PRODUCTS PRODUCED BY THE SAME
George C. Bond, Freeport, and George E. Ham and Dallas E. Hamilton, Lake Jackson, Tex., assignors to The Dow Chemical Company, Midland, Mich., a corporation of Delaware
No Drawing. Filed May 11, 1966, Ser. No. 549,195
U.S. Cl. 260—534                                14 Claims
Int. Cl. C07c 99/00; C02b 5/06

This invention relates to a process for preparing carboxymethylated polyethylenimine and to the product so produced. More particularly, it relates to a process for producing polyethylenimine (PEI) having carboxymethyl groups substituted for hydrogen on the primary and secondary amine groups.

The carboxymethylation of ethylenediamine was described by Bersworth et al., J. Org. Chem., 14, 355 (1949). The Bersworth process involves the slow addition of formaldehyde to a mixture of amine, caustic, and sodium cyanide (NaCN), under strongly alkaline conditions. Gregor et al., J.A.C.S., 77, 4743 attempted to apply the procedure described by Bersworth to PEI with unsatisfactory results. Only the secondary nitrogens of the PEI were carboxymethylated, and the product was only partially soluble in an alkaline solution. They therefore prepared carboxymethylated PEI by adding methyl-alpha-chloroacetate to a mixture of ethylenimine (EI) and triethylamine, allowing the mixture to react for 16 hours at 5° C., polymerizing the resulting methyl ester of N-ethylenglycine at room temperature with dibutylsulfate, saponifying with sodium hydroxide, and passing over an acidic ion exchange resin.

It has now been discovered that carboxymethylated PEI can be prepared from EI or PEI, formaldehyde, and hydrogen cyanide or alkali metal cyanides. A substantially equivalent quantity of EI or PEI, based on a molecular weight of 43 for EI and a mer unit of 43 for PEI, is combined with formaldehyde at a temperature of from about −15° C. to 40° C. and the resulting reaction is allowed to continue until it subsides. The methylol addition product thus formed is combined with a substantially equivalent quantity of hydrogen cyanide or alkali metal cyanide within the same temperature range. The resulting product is hydrolyzed with an alkali metal hydroxide at a temperature from about 50° C. to about 110° C. The resulting carboxymethylated PEI has a molecular weight of about 4,000 to about 300,000. Alternatively, glycolonitrile may be substituted for both the formaldehyde and the cyanide compound.

When EI is used as the starting material, polymerization occurs to some extent automatically during the process. It is facilitated, however, by the addition of an acid catalyst, e.g., sulfuric acid, hydrochloric acid, and the like. If PEI is used as the starting material, further polymerization does not occur. The molecular weight of the product from PEI will thus depend on the molecular weight of the PEI used. Satisfactory methods for measuring the molecular weight of the products from EI are not available. When prepared according to the conditions specified herein, such carboxymethylated PEI prepared from EI has an estimated molecular weight between about 4,000 and 7,000.

When ethylenimine is used as the starting material, the process can be illustrated by the following four-step reaction:

(1) 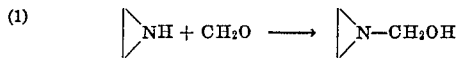

(2) 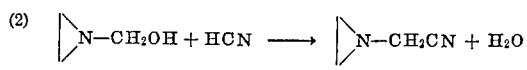

(3) 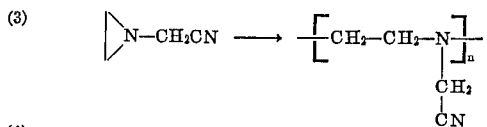

(4) 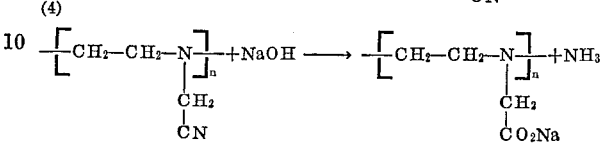

These four stages are believed to occur, but the polymerization does not necessarily take place at the point in the sequence given. The reaction steps when PEI is used as the starting material are analogous to (1), (2), and (4) above.

The resulting carboxymethylated PEI is believed to have the following general formula, whether EI or PEI is used as the starting material:

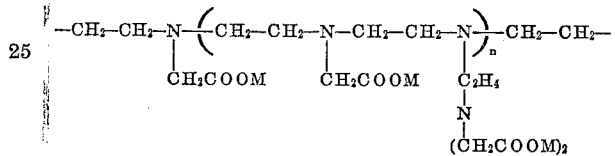

wherein M is an alkali metal, and n is an integer from about 15 to about 2,300. The above formula is, of course, idealized. The branching shown is illustrative only, i.e., the actual branching may be irregular.

PEI having a molecular weight between about 600 and about 100,000 is operable for use as a starting material in the process of this invention. Methods for preparing such PEI are known in the art, and are reviewed by Jones, "The Polymerization of Olefin Imines," in P. H. Plesch, Ed., The Chemistry of Cationic Polymerization (New York, MacMillan, 1963), pp. 521–534.

Suitable cyanide compounds for the practice of this invention include hydrogen cyanide and the alkali metal cyanides. Preferable are hydrogen cyanide, sodium cyanide, and potassium cyanide. The alkali metal hydroxides are suitable for the hydrolysis step. The preferred alkali metal hydroxides are sodium hydroxide and potassium hydroxide.

In general, any catalyst suitable for the polymerization of EI may be used to aid polymerization when EI is the starting material. Such catalysts are disclosed by Jones, Id., p. 522. Preferable catalysts for the polymerization step are the mineral acids, e.g., hydrochloric acid and sulfuric acid. Such acid catalysts may be added to the reaction mixture at any step in the process. They are preferably added after the cyanide compound.

Unless otherwise indicated, the reactants used herein are combined in substantially equivalent quantities. As used herein, the term "substantially equivalent quantities" means that either reactant may be present in an excess of up to about 10 percent by weight.

In practice, the addition of formaldehyde to the EI or PEI is carried out at a temperature of from about −15° C. to about 40° C. The preferred temperature range for this addition is about 0° C. to about 30° C. If less than a substantially equivalent quantity of formaldehyde is added to the EI or PEI the resulting product is a poor chelating agent. The addition of more than a substantially equivalent quantity of formaldehyde may result in polymerization of the excess formaldehyde. The reaction of the EI or PEI and the formaldehyde is allowed to continue until it subsides.

3

The addition of the cyanide compound is carried out at a temperature of about −15° C. to about 40° C. The preferred temperature range is from about 0° C. to 40° C.

The hydrolysis step may be carried out at a temperature of about 50° to 110° C. At temperatures below about 50° C. the hydrolysis proceeds slowly and is therefore impractical to run. The preferred temperature range is about 90° C. to 110° C. If any alkali metal cyanide is used in the previous step, adding equivalent alkali metal hydroxide for hydrolysis may be omitted. Preferably, up to about 10 percent of the stoichiometric quantity of alkali metal hydroxide is used in this case to insure complete hydrolysis.

The compositions produced according to the present invention are useful primarily as chelating agents and as polyampholytes.

The following specific examples describe completely representative specific embodiments and the best modes contemplated by the inventors for carrying out the claimed invention. The scope of the invention is to be limited, however, only by the scope of the claims appended hereto.

EXAMPLE 1

A quantity of 79.7 g. of a 50.5 weight percent aqueous solution of PEI having an average molecular weight of between about 30,000 and 40,000 and having 4.82 percent by weight primary nitrogen, 7.5 percent by weight secondary nitrogen, and 3.45 percent by weight tertiary nitrogen was placed in a reaction vessel equipped with stirring means and temperature control. To the PEI was added 79.1 g. of 37 percent by weight formaldehyde dissolved in 101 g. of water. The addition was made over a time period of 8 minutes and the average temperature was maintained at about 30° C. After the resulting reaction had subsided, 33 ml. of 98.6 percent by weight HCN was added over a 5 minute time period while maintaining the solution temperature at about 30° C. The reaction mixture was allowed to digest for about 17 hours at about 35° C. and was then filtered. Hydrolysis of the filtrate was carried out with 67.9 g. of 50 percent by weight sodium hydroxide at a temperature of about 100° C.

A quantity of 273.7 g. of aqueous carboxymethylated PEI solution was obtained, which had a calculated molecular weight of about 100,000.

The chelating properties of the carboxymethylated PEI were determined by the calcium chloride test and the copper sulfate test. For the calcium chloride test, a 10 ml. sample of the carboxymethylated PEI (12.60 g.) was titrated with a 0.416 M $CaCl_2$ solution until the sample became cloudy. The sample chelated 0.68 mg. mol calcium/g. total solid chelant, which is equivalent to a chelation of 410 mg. $CaCO_3$/g. total solid chelant. For the copper sulfate test, a quantity of 25 ml. of a 0.15 M $CuSO_4$ solution was added to 3 ml. of the carboxymethylated PEI, and the excess $CuSO_4$ was titrated with a 0.05 percent by weight solution of a sodium salt of ethylenediaminetetraacetic acid to determine the net $CuSO_4$ tied up by the sample. The carboxymethylated PEI chelated 4.6 g. $Cu^{++}$/100 g. used. This is equivalent to 7.52 g. $Cu^{++}$/g. mol of EI reacted.

EXAMPLE 2

A quantity of 68.4 g. of 37 percent by weight formaldehyde in water was placed into a reaction vessel equipped with stirring means and temperature control as in Example 1. The temperature was adjusted to about 10° C. and 36.7 g. 99.75 percent by weight EI was added to the formaldehyde over a 22 minute time period while maintaining the solution temperature at about 30° C. A water clear intermediate product resulted.

The product was cooled to 10° C. and 22.9 ml. of 97 percent by weight HCN was added over a 15 minute time period, and the mixture was digested for 95 minutes at 18° C. The resulting reaction product was cooled and added dropwise to a reaction vessel containing 67.6 g. of 50 percent by weight aqueous NaOH and an additional 120 ml. of water. This mixture was digested for 70 minutes at a temperature of 100° C. Hydrolysis was determined to be complete by the Nessler test for ammonia in the product.

A quantity of 187.6 g. of aqueous carboxymethylated PEI solution was obtained. The product had a color of 13 on the Gardner scale and 48.8 percent by weight solids. The carboxymethylated PEI had an estimated molecular weight of about 6,000.

The chelating properties of the carboxymethylated PEI were determined as in Example 1. The sample chelated an equivalent of 500.38 milligrams as $CaCO_3$/g. aqueous product at pH 11 and 29.3 g. $Cu^{++}$/g. mol EI used.

EXAMPLE 3

Into a reaction vessel equipped with means for stirring and temperature control were placed 83.7 g. of PEI having the properties as in Example 1, 81.8 g. of 50 percent by weight NaOH and 150 ml. of water. A quantity of 157.5 g. of glycolonitrile was added to this mixture over a 40 minute time period at a temperature of 98° C. During the addition, ammonia was given off by the reaction solution. The reactants were digested for 70 minutes at 98° C., and hydrolysis was determined to be complete by the Nessler test for ammonia in the product. A quantity of 287.3 g. of aqueous carboxymethylated PEI solution having a solids content 44.4 weight percent and an average calculated molecular weight of about 100,000 was obtained. The carboxymethylated PEI chelated 15.7 g. $Cu^{++}$/g. mol EI used.

EXAMPLE 4

Into a reaction vessel equipped with means for stirring and temperature control were placed 133.6 g. of EI and 135 ml. water. To this was added 513.0 g. of 37 percent by weight glycolonitrile in water over a 45 minute time period while maintaining the temperature at 15° C. Upon completion of the addition the reaction mixture was digested for 105 minutes at 45° C. From this reaction, 772.6 g. of solution product was obtained.

A quantity of 346.7 g. of the above solution product was hydrolyzed by adding 120.8 g. of 50 percent by weight sodium hydroxide and 145 ml. of water and heating the mixture with stirring for 100 minutes at 93° C. Hydrolysis was determined to be complete by the Nessler test. There was obtained 398.2 g. of a dark brown solution product having 41.6 weight percent solids and 29.5 weight percent of the sodium salts of carboxymethylated PEI. The carboxymethylated PEI had an estimated molecular weight of about 6,000 and chelated 10.75 g. $Cu^{++}$/g. mol EI used.

EXAMPLE 5

Into a reaction vessel equipped with stirring means and temperature control was placed 172.9 g. of 37 percent by weight formaldehyde, followed by the addition of 92 g. of EI over a 40 minute time period at a temperature of 28° C. After the addition, the contents of the vessel were digested for 25 minutes at 28° C. To this product was added 58.3 g. of 98.6 percent by weight HCN over a 12 minute time period at a temperature of 22° C.

A quantity of 10 ml. of 1 N HCl was added to the reaction mixture in order to promote polymerization. The temperature was raised to 100° C. for 7 minutes, and the reaction vessel was allowed to cool and stand overnight. A quantity of 292.1 g. of product was obtained.

A quantity of 155 g. of the above product was hydrolyzed by the addition of 94.8 g. of 50 percent by weight NaOH and 100 ml. water. This mixture was heated from 18° C. to 103° C. for 80 minutes. From the hydrolysis, 320.9 g. of aqueous carboxymethylated PEI having an estimated molecular weight of about 6,000 was obtained. The carboxymethylated PEI chelated 18.5 g. $Cu^{++}$/g. mol EI used.

EXAMPLE 6

Into a reaction vessel equipped with stirring means and temperature control was placed 107.4 g. of 36.3 percent by weight formaldehyde. To this was added 56.0 g. of EI over a 31 minute time period, maintaining the temperature at from −10° C. to 10° C. After the addition, the contents of the vessel were digested for 60 minutes at 10° C. A quantity of 195 ml. of a solution prepared by adding 65.2 g. of NaCN to 220 ml. of distilled water was added to the reaction mixture over a 22 minute time period at a temperature between −5° C. and 5° C. After the addition, the mixture was digested for 50 minutes at room temperature.

Hydrolysis was accomplished by adding 10.4 g. of 50 percent by weight NaOH and 100 ml. of water to the above product over a 25 minute time period at a temperature of 99° C. and digesting the resulting mixture for 35 minutes at 99° C. A quantity of 279.4 g. of aqueous carboxymethylated PEI solution was obtained. The carboxymethylated PEI had an estimated molecular weight of about 5,000 to 7,000 and chelated 11.97 g. $Cu^{++}$/g. mol EI used.

A similar reaction product is obtained when KCN is substituted for NaCN and KOH is substituted for NaOH in the above procedure.

What is claimed is:
1. A method for producing a carboxymethylated polyethylenimine which comprises:
   (1) combining substantially equivalent quantities of
      (A) ethylenimine or polyethylenimine, and
      (B) formaldehyde,
   at a temperature of from about −15° C. to 40° C., and allowing the resulting reaction to continue until it subsides;
   (2) combining the intermediate product thus formed with a substantially equivalent quantity of a compound selected from the group consisting of hydrogen cyanide and an alkali metal cyanide, at a temperature from about −15° C. to 40° C.; and
   (3) hydrolyzing the product thus produced with an alkali metal hydroxide, at a temperature from about 50° C. to 110° C. to give a carboxymethylated polyethylenimine.

2. The method of claim 1 wherein ethylenimine is reacted with the formaldehyde in step 1.

3. The method of claim 1 wherein ethylenimine is reacted with the formaldehyde in step 1, said method additionally comprising the addition of an acid polymerization catalyst to the reaction mixture.

4. The method of claim 1 wherein polyethylenimine is reacted with the formaldehyde in step 1.

5. A carboxymethylated polyethylenimine prepared by the process of claim 1.

6. A method for producing a carboxymethylated polyethylenimine which comprises:
   (1) combining substantially stoichiometric quantities of ethylenimine or polyethylenimine and glycolonitrile at a temperature of from about −15° C. to 40° C., and allowing the resulting reaction to continue until it subsides; and
   (2) hydrolyzing the compound thus formed with an alkali metal hydroxide, at a temperature from about 50° C. to 110° C. to give a carboxymethylated polyethylenimine.

7. The method of claim 6 wherein ethylenimine is reacted with the glycolonitrile in step 1.

8. The method of claim 6 wherein ethylenimine is reacted with the glycolonitrile in step 1, said method additionally comprising the addition of an acid polymerization catalyst to the reaction mixture.

9. The method of claim 6 wherein polyethylenimine is reacted with the glycolonitrile in step 1.

10. A carboxymethylated polyethylenimine produced by the process of claim 6.

11. The method of claim 1 wherein the cyanide compound of step 2 is HCN.

12. The method of claim 1 in which the cyanide compound of step 2 is an alkali metal cyanide, and the alkali metal hydroxide of step 3 is used in a quantity from 0 to about 10 percent of its equivalent amount.

13. The method of claim 1 in which the alkali metal cyanide is sodium cyanide.

14. The method of claim 1 wherein NaOH is the alkali metal hydroxide of step 3.

References Cited

UNITED STATES PATENTS

| 3,119,790 | 1/1964 | Tsou | 260—239 XR |
| 3,285,909 | 4/1966 | Rabourn et al. | 260—239 |

FOREIGN PATENTS

Gregor et al., J. Am. Chem. Soc. vol. 77, pp. 4743–4745 (1955).

Kostyanouskii, Doklady Akad. Nauk SSSR, vol. 135, pp. 853–856.

JAMES A. PATTEN, *Primary Examiner.*

A. P. HALLUIN, *Assistant Examiner.*

U.S. Cl. X.R.

252—89; 260—239, 438.1